United States Patent

[11] 3,592,382

[72] Inventor Boyd P. Byrer
     South Bend, Ind.
[21] Appl. No. 878,123
[22] Filed Nov. 19, 1969
[45] Patented July 13, 1971
[73] Assignee The Bendix Corporation

[54] CONTROL APPARATUS HAVING REDUNDANT CONDITION-SENSING MEANS AND FAILURE INDICATOR
9 Claims, 10 Drawing Figs.

[52] U.S. Cl............................................. 236/86,
     60/39.09, 60/39.28, 137/82, 244/78
[51] Int. Cl............................................. G05d 23/00
[50] Field of Search............................................. 60/39.09,
     39.28; 137/82, 85; 236/79, 85, 86; 244/78;
     318/563, 564

[56] References Cited
UNITED STATES PATENTS
3,269,676  8/1966  Hopkins........................ 318/564 X
3,274,443  9/1966  Eggenberger et al. ....... 318/564 X
3,322,344  5/1967  Peczkowski et al. ..........  236/86
3,094,839  6/1963  Kinney ........................ 60/39.09
3,338,139  8/1967  Wood........................... 244/78 X
3,358,565  12/1967 Townsend .................... 244/78 X Primary Examiner—William F. O'Dea
Assistant Examiner—P. D. Ferguson
Attorney—Plante, Arens, Hartz, Smith & Thompson ABSTRACT: A casing contains two fluid-pressure-responsive members each of which is responsive to an associated input fluid pressure which varies as a function of the same sensed variable condition. A servo valve actuated in response to the higher of the two outputs of the fluid-pressure-responsive members controls a servovalve which, in turn, establishes a control output which controlled servo pressure is applied to a separate feedback-fluid-pressure-responsive member associated with each of the two fluid-pressure-responsive members and connected to oppose the output thereof. A loss of input fluid pressure to either fluid-pressure-responsive member results in actuation of a visual failure indicator by the associated feedback-fluid-pressure-responsive member while the input fluid pressure to the remaining fluid-pressure-responsive member maintains the desired servo fluid pressure.

3,592,382

PATENTED JUL 13 1971

INVENTOR.
BOYD P. BYRER

BY
Gordon N. Cheney
AGENT

INVENTOR.
BOYD P. BYRER
BY
Gordon N. Cheney
AGENT

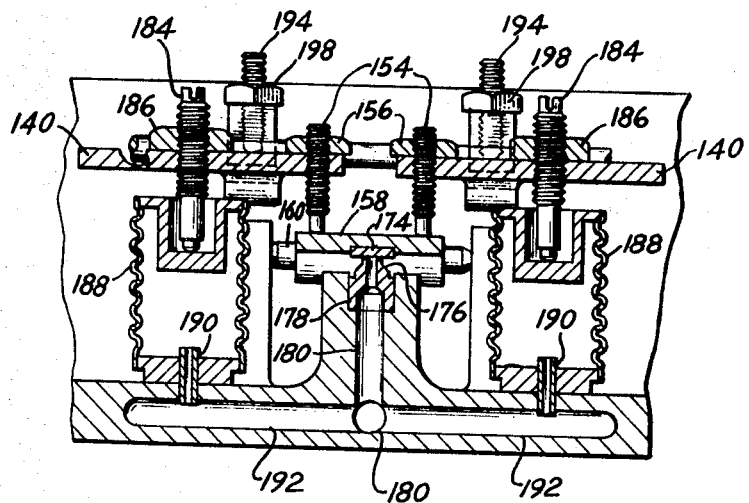
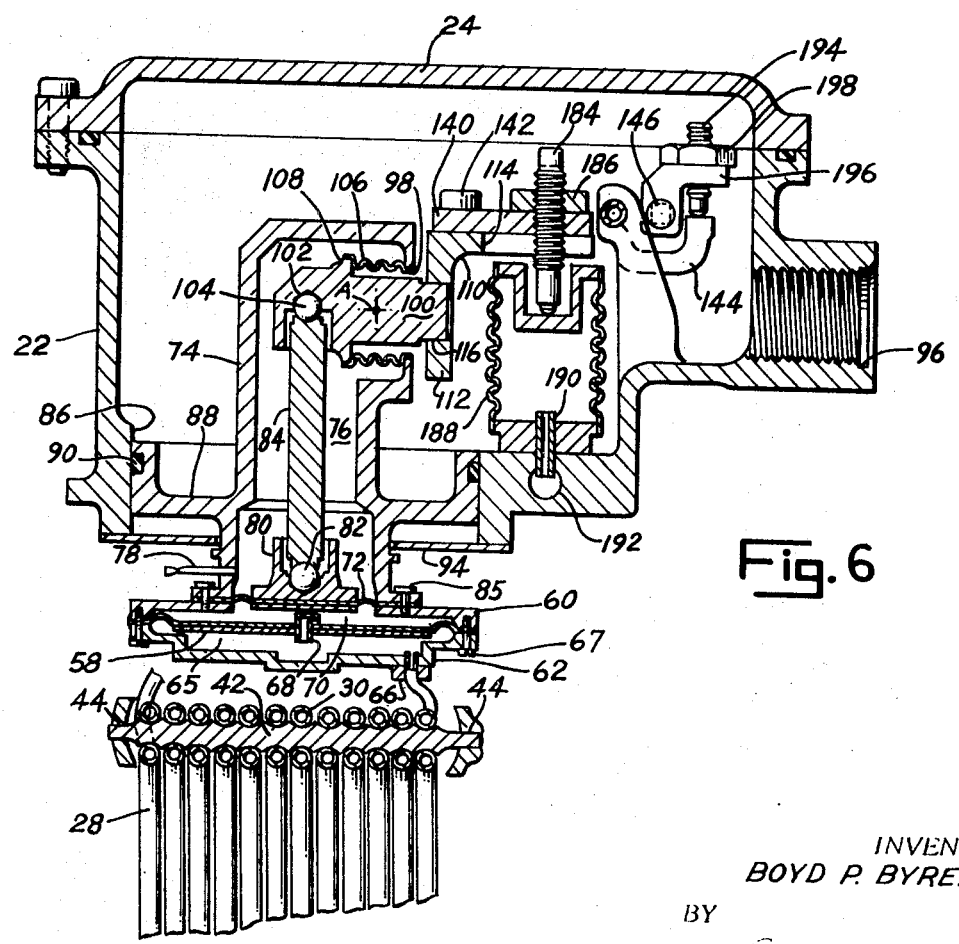
INVENTOR
BOYD P. BYRER

PATENTED JUL 13 1971
3,592,382
SHEET 4 OF 4
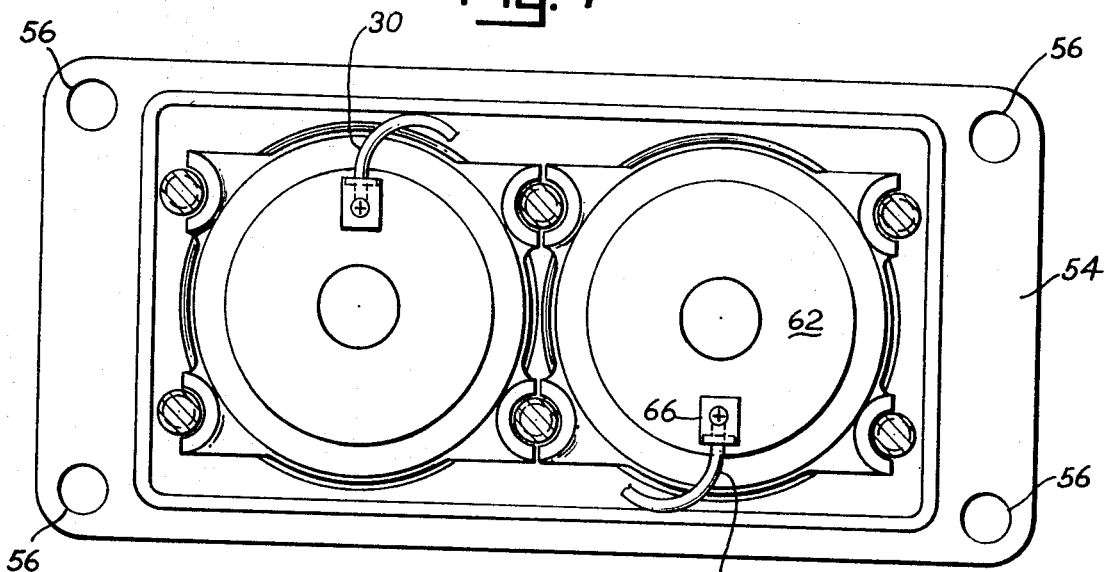
Fig. 7
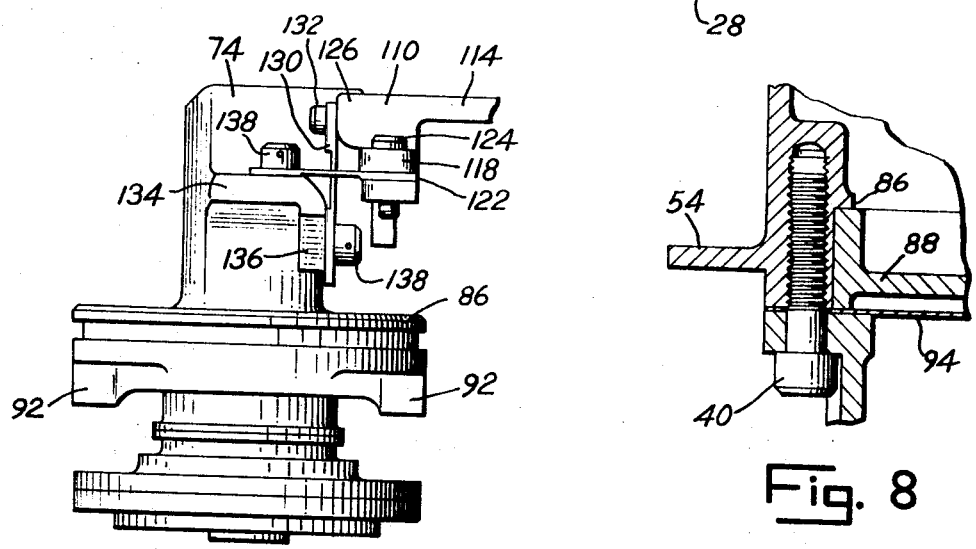
Fig. 8
Fig. 9
INVENTOR.
BOYD P. BYRER
BY
*Gordon N. Chance*
AGENT 3,592,382

1

CONTROL APPARATUS HAVING REDUNDANT CONDITION-SENSING MEANS AND FAILURE INDICATOR

BACKGROUND OF THE INVENTION

The present invention relates to control apparatus for converting an input variable signal such as a temperature to an amplified output signal such as a servo fluid pressure which varies as a function of the input signal and provided with duplicate control mechanisms either of which is operative following failure of the other as, for example, in the event of loss of the input signal to one of the same and further operative to energize means indicating said failure.

It is well known in the field of control mechanisms wherein performance reliability is a requisite as, for example, aircraft control systems or the like, to provide redundant control networks any one of which is operative independently of the remaining networks to convert a variable input signal such as temperature to an amplified output signal such as a servo fluid pressure. The conventional practice in the case of the above-mentioned temperature-responsive devices, for example, is to provide identical separately housed control networks having separate temperature inputs and providing separate output servo fluid pressures derived from a source of pressurized fuel as a function of the sensed temperature. Failure-indicating mechanism associated with each device provides the desired signal indicating failure thereof. In addition, suitable fluid-pressure-responsive or "select high" mechanism is required to receive and distinguish between the two output servo fluid pressures thereby providing a resulting control servo pressure which is higher of the two sensed servo fluid pressures. Obviously, such duplicate hardware for generating the desired dual servo pressures as a function of a sensed temperature together with the need for "select high" hardware for selecting the highest servo pressure for control purposes as well as the necessary servo-fuel-pressure-transmitting lines needed for interconnection purposes is not desirable for aircraft use where space in the engine environment is limited, weight should be held to a minimum, and potentially hazardous fuel leakage must be minimized for obvious reasons of safety.

It is, therefore, an object of the present invention to provide a compact, relatively lightweight and reliable redundant control apparatus including dual independently operating signal-transmitting mechanisms responsive to a common variable condition or input signal, a servo valve for controlling an amplified output fluid pressure in response to the stronger of the two input signals and a failure-indicating element actuated by either of the dual signal-transmitting means in response to signal transmission failure thereof.

It is another object of the present invention to provide hydromechanical control apparatus of the redundant type wherein one servo valve for controlling an output fluid pressure is activated by either of two independently operating control circuits responsive to a common input signal applied thereto and wherein a failure indicator common to both control circuits is energized by either of the control circuits to indicate malfunction thereof.

It is an important object of the present invention to provide hydromechanical control apparatus for controlling an amplified fluid pressure output as a function of an input signal of the redundant type wherein duplication of elements is minimized and external fluid transmission lines are reduced to a minimum by providing a common casing housing the major portion of the control apparatus.

2

Figure 1:
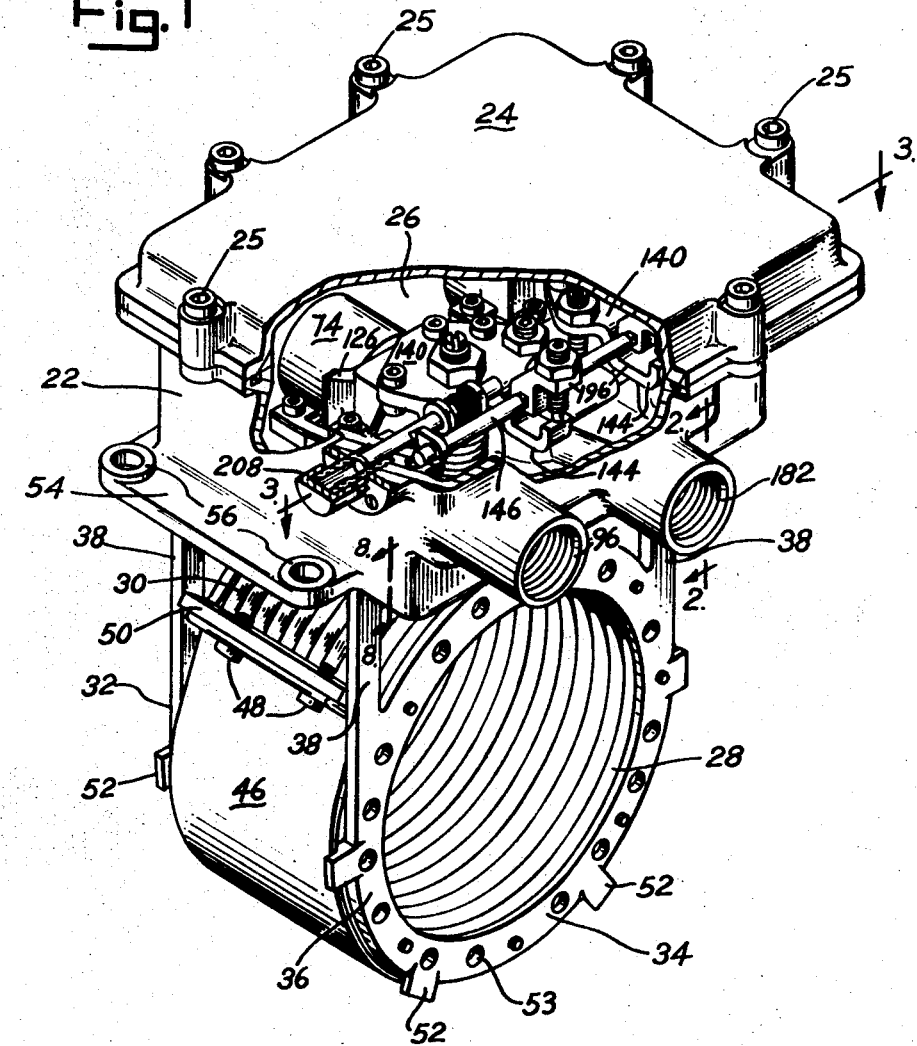
FIG. 1 represents the present invention shown in perspective with a portion of the casing removed to illustrate interior mechanism.
Figure 10:
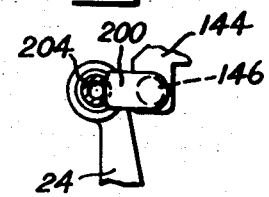
Figure 3:
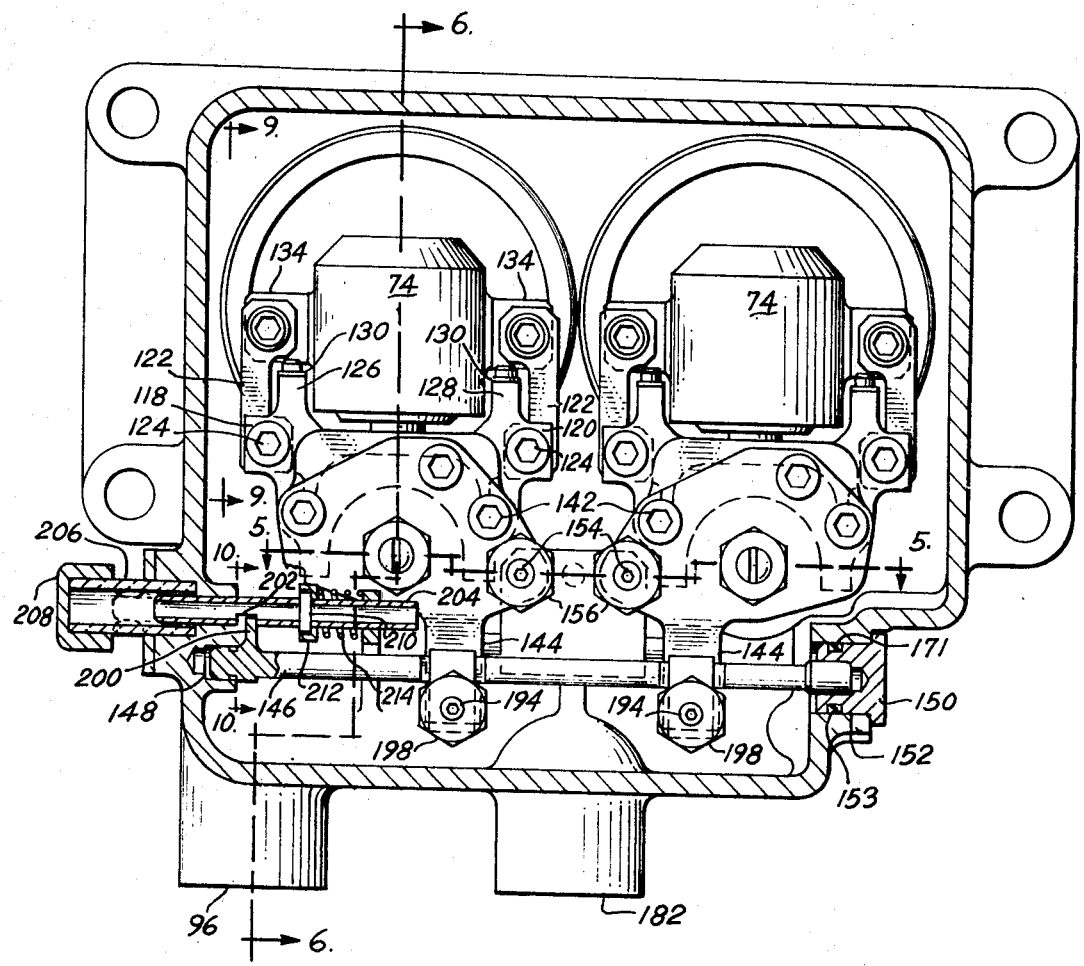
FIG. 3 represents a sectional view taken on line 3-3 of FIG. 1.
Figure 4:
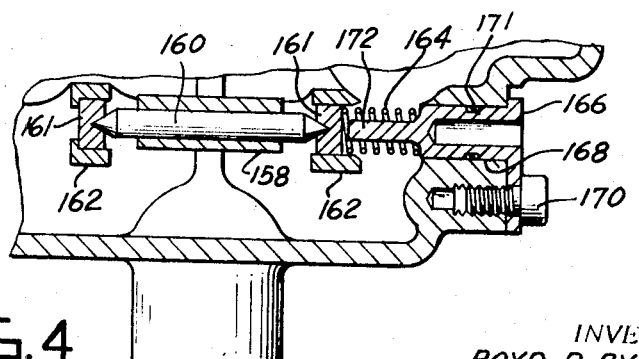

FIG. 4 represents a sectional view taken on line 4-4 of FIG. 3;

FIG. 5 represents a sectional view taken on line 5-5 of FIG. 3;

FIG. 6 represents a sectional view taken on line 6-6 of FIG. 3;

FIG. 7 represents a bottom view of FIG. 1 with the helically wound temperature-responsive coils removed therefrom;

FIG. 8 represents a sectional view taken on line 8-8 of FIG. 1;

FIG. 9 represents a sectional view taken on line 9-9 of FIG. 3;

FIG. 10 represents a sectional view taken on line 10-10 of FIG. 3.

DESCRIPTION OF THE PREFERRED EMBODIMENT

Referring to the drawings and, in particular, FIG. 1, the present invention is shown in a preferred form for use with a combustion engine such as a gas turbine engine, not shown. A casing or housing 22 is provided with a cover 24 suitably secured thereto by fastening means such as bolts 25 to define a sealed chamber 26. A pair of concentric helically wound coils of tubing 28 and 30 filled with a pressurized gas such as helium are each sealed at one end and vented at the opposite end to associated pressure-responsive means as will be described. The coils 28 and 30 are supported by spaced-apart brackets 32 and 34 each of which is provided with an annular portion 36 and legs 38 which legs are secured to casing 22 by any suitable fastening means such as bolts 40 (see FIG. 8). The coils 28 and 30 are supported in spaced-apart relationship by suitable spacing means 42 having end portions which extend through matching openings 44 in brackets 32 and 34. The radially outermost coil 30 is protected by a shield 46 secured at opposite end portions by fastening means 48 threadedly engaged with spacing bars 50 which, in turn, are interposed between brackets 32 and 34 and fixedly secured thereto by any suitable fastening means such as a weld. Tabs 52 integral with brackets 32 and 34 engage shield 46 to hold the same in position relative to coils 28 and 30. A plurality of openings 53 in annular portion 36 provides for airflow between the coils 28 and 30.

The casing 22 is provided with a flange 54 having spaced-apart openings 56 adapted to receive fastening means, not shown, which secure casing 22 to a desired location on the engine, not shown. In the preferred gas turbine engine environment, the casing 22 may be suitably mounted adjacent the usual air compressor thereof with the coils 28 and 30 extending through a suitable opening in the engine casing into the inlet airflow to the compressor. In this manner, compressor inlet airflow temperature is sensed as a result of the temperature response of the helium contained by coils 28 and 30 which helium generates a pressure output which varies in proportion to the sensed airflow temperature in accordance with the well-known Charles Law.

Obviously, the present invention is not limited to use in the above-mentioned preferred environment since the coils 28 and 30 may be exposed to any fluid the temperature of which is desired as a controlling parameter.

A diaphragm 58 is clamped at its outermost portion between a circular housing member 60 and a mating cap 62 and partially defines a fluid chamber 65. The open end of coiled tube 30 is vented through cap 62 to chamber 65 and is removably secured in position on cap 62 by suitable fastening means 66 providing a fluid pressure seal. The cap 62 may be fixedly secured in position by fastening means such as screws 67 threadedly engaged with housing member 60. A fluid restriction 68 fixedly secured to diaphragm 58 communicates chamber 65 with a chamber 70 at the opposite side of diaphragm 58. A diaphragm 72 clamped at its outermost portion between housing member 60 and a housing member 74 is exposed to chamber 70 on one side and an evacuated chamber 76 defined by housing member 74 on the opposite side. The chamber 76 may be evacuated via tube 78 suitably connected to housing member 74 and adapted to be connected to an external source of vacuum, not shown, after which tube 78 may be crimped to seal chamber 76. A cup-shaped retaining member 80 fixedly secured to the innermost portion of diaphragm 72 is adapted to receive a ball 82 against which one end of a rod 84 bears. The housing members 60 and 74 may be secured together by any suitable fastening means such as 85.

In general, the diaphragms 58 and 72 are responsive to the variable fluid pressure derived from tube 30 and serve to generate a force which varies as a function of the temperature impressed on coiled tube 30 as well as the rate at which a temperature variation occurs. Reference is made to U.S. Pat. No. 3,322,344 issued May 30, 1967 to J. L. Peczkowski and D. C. Thoman, (common assignee), and entitled "Temperature Sensor Having Rate of Change of Temperature Sensing Means" for further details of the above-described apparatus including diaphragms 58 and 72. In view of U.S. Pat. No. 3,322,344, no claim is made to structure, per se, thereof which is common to the present invention.

The casing 22 is provided with an opening 86 which slidably receives a circular flanged wall portion 88 integral with housing member 74. An O-ring seal 90 suitably carried by the wall portion 88 serves as a fluid seal between adjacent surfaces of wall portion 88 and casing 22. The wall portion 88 is extended at 92 to bear against a baffle plate 94 removably secured to casing 22 by bolts 40 two of which extend through legs 38 and plate 94 into threaded engagement with casing 22.

It will be understood that the above-described structural elements 58 through 94 are duplicated for coiled tube 28 thereby providing independent sources of an input force which varies as a function of the fluid temperature to which coiled tubes 28 and 30 are exposed.

The interior of casing 22 is vented via a port 96 to a source of drain fluid pressure, not shown, but which, in the case of a gas turbine engine fuel system, may be relatively low-pressure fuel at the inlet to the usual engine fuel pump.

Each housing member 74 is provided with an opening 98 through which a lever 100 extends. A recess 102 in one end of lever 100 is adapted to receive a ball 104 against which the output end of rod 84 bears thereby providing an actuating link between diaphragms 58, 72 and lever 100. A bellows seal 106 surrounds lever 100 and is fixedly secured at one end to a circular flange 108 formed on lever 100. The opposite end of bellows 106 is fixedly secured to housing member 74 at the opening 98. The ends of bellows 106 are fixedly secured to flange 108 and housing member 74 by any suitable means such as brazing to provide a fluid pressure seal between the evacuated chamber 76 and the interior of casing 22 at relatively higher fuel pump inlet pressure.

An angled bracket or lever 110 has flat wall portions 112 and 114 extending at a right angle. An opening 116 in wall portion 112 receives the output end of lever 100 which is fixedly secured thereto by any suitable means such as a weld. The bracket 110 is pivotally secured to housing member 74 by flex pivots for pivotal movement in response to movement of lever 100. To that end, the bracket 110 is provided with spaced-apart arms 118 and 120 integral thereto each of which support one end of an associated flexible metal strip 122 secured thereto by a bolt and nut combination 124. A second pair of spaced-apart arms 126 and 128 integral with bracket 110 extend at a right angle to arms 118 and 120, respectively. Each arm 126 and 128 supports one end of an associated flexible metal strip 130 secured thereto by a screw 132. The flexible metal strip 122 and associated flexible metal strip 130 immediately adjacent thereto cross as shown and are mutually perpendicular. The free ends of flexible metal strips 122 and 130 are secured to associated arms 134 and 136, respectively, integral with wall portion 112 of lever 100 by any suitable means such as a screw 138. It will be understood that the spaced-apart sets of flexible metal strips 122 and 130 support lever 100 for pivotal movement about an axis A–A defined by a line passing through the intersecting flexible strips 122 and 130.

A plate 140 securely attached to wall portion 114 by screws 142 threadedly engaged with wall portion 114 is provided with an arm 144 which is bent to clear a rotatable shaft 146 which has one end retained by a recess 148 in casing 22 and the opposite end retained by a recessed plug 150. The plug 150 may be press fitted in an opening 152 in casing 22 to secure the plug 150 in position. An O-ring seal 153 suitably carried by plug 150 provides a fluid seal between adjacent surfaces of plug 150 and casing 22.

A screw member 154 threadedly engaged with plate 140 is adjustably secured in position by a locknut 156. The screw member 154 bears against a pivotally mounted lever 158 carried by a shaft 160 which, in turn, is secured at each end by a bearing member 161 carried by a fixed support 162. The shaft is spring loaded axially in position by a spring 164 interposed between one bearing member 161 and a retainer 166. The retainer 166 is slidably received by an opening 168 in casing 22 and secured in position therein by a screw 170 threadedly engaged with casing 22. An O-ring seal 171 suitably carried by retainer 166 provides a fluid seal between adjacent surfaces of retainer 166 and casing 22. An extension 172 of retainer 166 extends through spring 164.

Figure 2:
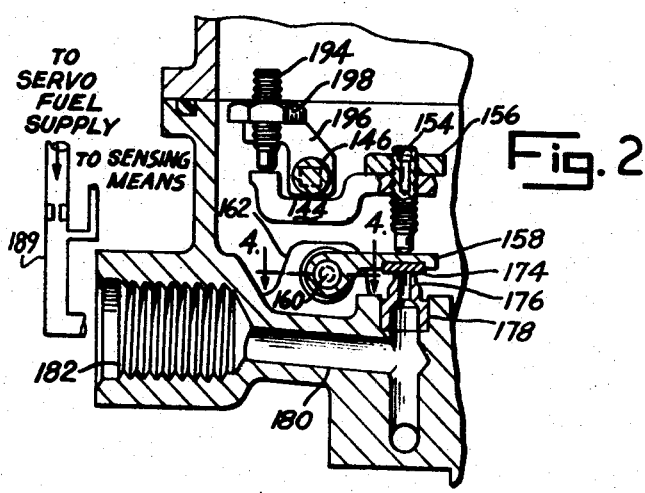
FIG. 2 represents a sectional view taken on line 2-2 of FIG. 1.

A valve flapper 174 fixedly secured to lever 158 coacts with a valve orifice 176 fixedly secured in a recess 178 in casing 22 at the discharge end of a passage 180 leading to a pressurized fuel inlet 182 in casing 22. It will be understood that the fuel inlet 182 may be suitably connected to a pressurized fuel source such as restricted passage 189 (FIG. 2) provided with a pressure tap intermediate the restriction therein and valve orifice 176 for transmitting the variable pressure generated therein to conventional pressure-sensing means, not shown.

A screw member 184 threadedly engaged with plate 140 is adjustably secured in position by a lock nut 186 and bears against the movable closed end of a feedback bellows 188 the opposite end of which is fixedly secured to casing 22 by any suitable fastening means providing a fluid seal. The bellows 188 is vented internally to passage 180 via a port 190 and passage 192.

The arm 144 of plate 140 is adapted to engage a screw member 194 threadedly engaged with an arm 196 and adjustably secured in position by a locknut 198. The arm 196 is fixedly secured to shaft 146 which is rotated in response to movement of arm 196 as will be described. The shaft 146 is provided with an arm 200 which extends into a slot 202 formed in a tubular member 204 slidably covered by casing 22 and adapted to be slidably received by a transparent tube 206 suitably secured in casing 22 as by a press fit and extending outwardly therefrom for visual observance. A cap 208 suitably secured to the external open end of tube 206 closes the open end thereof. An annular shoulder 210 formed on tubular member 204 is engaged by a spring retainer 212 slidably carried by tubular member 204. A compression spring 214 interposed between retainer 212 and casing 22 loads tubular member 204 axially against the resistance of arm 200.

OPERATION

It will be assumed that the fluid to which the coiled tubes 28 and 30 are exposed is at a constant temperature in which case the output fluid pressure derived from each of the tubes 28 and 30 is stable which, in turn, results in a zero fluid pressure differential across the respective diaphragms 58. The resulting fluid pressure differential between each chamber 70 and associated evacuated chamber 76 acts upon the diaphragm 72 therebetween to produce a force which is transmitted through rod 84 tending to load lever 100 causing the same to pivot in a clockwise direction about axis A–A as viewed in FIG. 6 thereby tilting bracket 110 as well as plate 140 secured thereto accordingly against the resistance of feedback bellows 188. The screw member 154 bearing against lever 158 urges the same in a clockwise direction as viewed in FIG. 2 causing valve flapper 174 to move toward orifice 176 which, in turn, causes an increase in servo fuel pressure in passage 180 upstream from orifice 176. The increase in pressure 180 is transmitted through passage 192 and port 190 to feedback bellows 188 which responds thereto to load plate 140 in opposition to the input force derived from lever 100 thereby establishing a force balance to stabilize valve flapper 174 and thus the servo fuel pressure in passage 180.

It will be noted that the lever 158 carrying valve flapper 174 operates on a "select high" basis in that it is positioned by either screw member 154 independently of the other depending upon which of the input forces derived from the respective diaphragms 72 is greatest.

In the event of a structural failure such as a rupture of either coiled tube 28 or 30 or associated diaphragms 72, the pressure differential across the diaphragm 72 tends to decrease to zero in which case the force input to the lever 100 associated therewith is lost which, in turn, results in the opposing force of corresponding feedback bellows 188 forcing screw member 154 away from lever 158. The lever 158 remains in position by virtue of the remaining screw member 154 bearing thereagainst thereby maintaining the position of valve flapper 174 a function of the sensed temperature.

The plate 140 and thus screw member 154 attached thereto is forced away from lever 158 in the above-mentioned manner resulting in engagement of arm 144 of plate 140 with associated screw member 194 of arm 196 attached to shaft 146. The shaft 146 rotates accordingly causing arm 200 to move out of engagement with slot 202 of tubular member 204 which, in turn, moves axially through tube 206 to a predetermined position therein under the influence of spring 214 thereby providing an externally visible indication of a failure. The tubular member 204 may be painted red or marked in any suitable manner to make the position thereof more obvious through transparent tube 206.

I claim:

1. Control apparatus including redundant variable input signal responsive means for controlling an output signal as a function of the input signal comprising:
   a casing;
   first means housed by said casing and responsive to a first input signal representing a variable condition of operation;
   second means housed by said casing and responsive to a second input signal representing said variable condition of operation;
   a movable member housed by said casing for controlling an output signal;
   control means operatively connected to said first and second means and said movable member for actuating said movable member in response to one of said first and second means depending upon which exhibits the greater response to said associated first and second input signals; and
   failure-indicating means operatively connected to said first and second means and responsive to said output signal for indicating a predetermined response failure of one of said first and second means.

2. Control apparatus as claimed in claim 1 wherein:
   said first and second input signals are defined by fluid pressures which vary as predetermined functions of said variable condition of operation; and
   said first and second means each include fluid-pressure-responsive means responsive to said fluid pressures defining said first and second input signals, respectively.

3. Control apparatus as claimed in claim 1 wherein:
   said output signal is derived from a pressurized fluid;
   said movable member is defined by valve means operatively connected to said pressurized fluid for controlling the pressure level thereof; and
   said failure-indicating means includes first and second fluid-pressure-responsive means responsive to said output signal and connected to said first and second means, respectively, for imposing a feedback force thereon.

4. Control apparatus as claimed in claim 2 wherein:
   said variable condition of operation is temperature of a fluid;
   said first and second means each include fluid-pressure-generating means responsive to said temperature for generating said first and second input signals as a predetermined function of said temperature; and
   said failure-indicating means is actuated by one of said first and second means independently of the other in response to failure of said fluid-pressure-generating means associated therewith.

5. Control apparatus as claimed in claim 1 wherein:
   said first and second input signals are defined by first and second input forces, respectively;
   said first and second means each includes pivotally mounted lever means responsive to said first and second input forces, respectively, and independently engageable with said movable member for loading the same depending upon the greater of said first and second input forces; and
   said failure-indicating means includes first and second force-generating means responsive to said output signal operatively connected to said lever means associated with said first and second means, respectively, in force-opposing relationship with said first and second input forces associated therewith.

6. Control apparatus as claimed in claim 4 wherein:
   said fluid-pressure-generating means is defined by helically wound tubing filled with a gas having the characteristic of expanding or contracting as a predetermined function of said fluid temperature to which said tubing is exposed;
   said helically wound tubing being sealed at one end and vented at the opposite end thereof to said fluid-pressure-responsive means associated therewith.

7. Control apparatus as claimed in claim 3 wherein:
   said first and second fluid-pressure-responsive means responsive to said output signal are bellows vented internally to said output signal.

8. Control apparatus as claimed in claim 5 wherein:
   said pivotally mounted lever means is supported by spaced-apart first and second flexible means operatively connected thereto;
   said first and second flexible means each including a pair of mutually perpendicular crossed flexible metal strips having opposite end thereof fixedly secured to said lever means and a fixed support, respectively.

9. Control apparatus as claimed in claim 1 wherein:
   said failure-indicating means includes a normally retracted spring-loaded member slidably contained by said casing and adapted to be urged by said spring outwardly from said casing to provide a visual signal external thereof;
   means engageable with said spring-loaded member for holding the same in a retracted position; and
   pressure-responsive means operatively connected to said last-named means and responsive to said output signal for disengaging said last-named means from said spring-loaded member in response to said failure.